Nov. 9, 1943.   R. F. BROWN   2,333,982
ELECTRICAL CONTACTOR DEVICE
Filed Oct. 11, 1940

INVENTOR
RAYMOND F. BROWN
BY
Paul L. Kesker
ATTORNEY

Patented Nov. 9, 1943

2,333,982

UNITED STATES PATENT OFFICE 2,333,982

ELECTRICAL CONTACTOR DEVICE

Raymond F. Brown, Indianapolis, Ind., assignor to Fairbanks, Morse & Co., Chicago, Ill., a corporation of Illinois Application October 11, 1940, Serial No. 360,778

5 Claims. (Cl. 200—153)

This invention relates to improvemets in control means for use in conjunction with apparatus for determining and recording values as, for example, a recording scale; more particularly the invention pertains to improvements in electrical contactor means associated with means for preventing premature operation of a recording mechanism, or to delay its operation until the apparatus to which such mechanism is responsive attains a stable condition.

The means described herein and constituting a presently preferred embodiment of my invention has particular application in connection with scales equipped with an electrically powered printing device that makes a permanent record of a weight value ascertained by the weighing mechanism, and the principal object of the invention is to provide improved means for controlling the action of electrical time delay apparatus that function automatically to retard operation of the recorder until the weighing mechanism has come to rest, whereby to preclude the recording of an incorrect weight value.

Another object is to provide an improved electrical contactor directly associated with and controlled by the scale indicator, whereby rotating or oscillating movements of the indicator shaft will be transmitted to the contactor which is adapted to control subsequent electrical time delay means.

Figure 1:
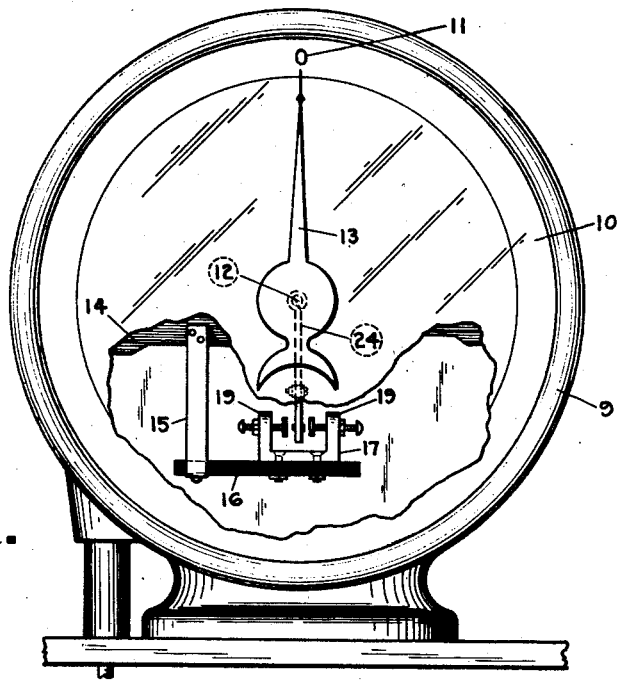
Figures 2, 3:
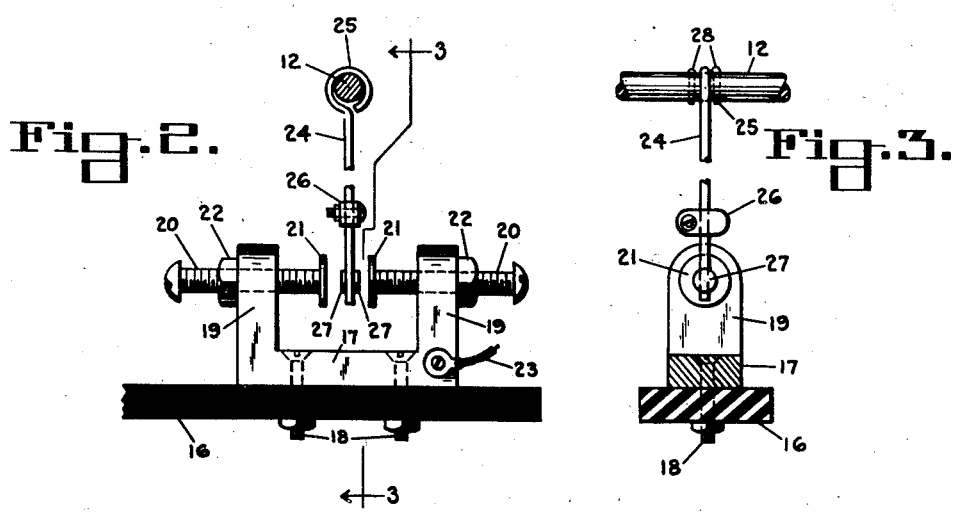

Further objects and advantages attained by the invention will appear from the following description of a preferred embodiment thereof, as illustrated in the accompanying drawing, in which:

Fig. 1 is a front elevation of a weighing scale dial with a section of the dial face broken away to show the means of the invention installed therein; Fig. 2 is an enlarged front view of the contactor mechanism; and Fig. 3 is a side elevation of the contactor mechanism as viewed from line 3—3 of Fig. 2.

Referring now by characters of reference to the drawing, numeral 9 designates a dial housing of a weighing scale which is provided with a chart 10 having suitable weight indicia, as at 11. Any suitable type of dial mechanism may be used, such, for example, as that shown and described in Patent No. 1,749,747, Automatic scale, H. A. Hadley, issued March 4, 1930. From an inspection of this patent it will be seen that the weight value of a load placed on the scale platform will be transmitted to the rotatable indicator shaft 12 which will move the pointer 13 to the appropriate indication of weight value.

The dial mechanism (not shown) is mounted on a suitable frame 14, which also serves to carry the vertical depending arm of an L-shaped supporting member 15, the lower, horizontal arm of which is a bar of insulating material 16. Mounted on bar 16 are electrical contactor means comprising a U-shaped holder 17, secured to bar 16 by screws 18, the upwardly extending arms 19 of which are each provided with a transverse, threaded opening through which are inwardly projected threaded screws 20 provided on their inner ends with contact plates 21. The screws may be adjusted in the threaded openings of arms 19 to effect the desired spacing of the contact plates, and the screws then secured in adjusted position by lock nuts 22.

Disposed at any suitable point on the holder 17 is a wire 23 (Fig. 2) which serves as one side of the electrical circuit to the time delay means.

A second wire for completing the circuit to the time delay means may be connected to any suitable point on the dial mechanism frame 14. The main circuit controlling element, or movable arm of the contactor switch, comprises a length of spring steel 24 having an eye or loop 25 formed at one end by which the said arm is mounted pendantly on the indicator shaft. The internal diameter of eye 25 exceeds that of the shaft 12 so that the area of mutual contact of these parts is relatively small. That is, the area of contact with the shaft extends approximately about one-quarter of the circumference of the shaft, hence the frictional effect of the contact arm tending to hamper shaft rotation is not appreciable. Accordingly the pendant contact arm will not adversely effect the operation of the indicator, or give rise to weighing errors. To give the contact arm 24 a smooth swinging or pendulum action, the member is weighted, the weight 26 being adjustable on the member 24. On each side at the lower end of arm 24, facing the contact plates 21, are secured contact tips 27.

It will be understood that rotation of the indicator shaft 12 will be transmitted to the arm 24, causing the latter to oscillate and bring contact tips 26 momentarily against first one and then the other of contact plates 21. The arm 24 is held from sliding along the shaft 12 by means of taper pins 28 (Fig. 3) inserted through the shaft, one on each side of eye portion 25.

From the foregoing description it will appear that the contact assembly constitutes a highly sensitive switch, which is responsive to the slightest rotating movement of the indicator shaft 12 to close a circuit through the wires leading to the time delay means. Such switch and the circuit which it controls is in open condition only when the weighing mechanism of the scale is completely at rest, except, of course, that the switch is open during the relatively short interval when the spring steel member 24 is moving from one to the other of the contact plates 21.

However, any movement of the indicator shaft 12 will cause the contacts to be closed, as hereinbefore described, and through the time delay mechanism described in the application above referred to, the recording of the weight value will be delayed until the contacts are open, thus removing any possibility of a premature, incorrect recording.

It will be understood that changes may be made in the apparatus described herein without departing from the spirit and full intendment of the invention, except as limited by the appended claims.

I claim:

1. In weighing apparatus, the combination with a rotatable shaft, of an electrical contactor device operable responsive to movement of said shaft, said device comprising a contact carrying arm loosely connected at its upper end to the shaft and adapted freely to oscillate relative thereto, a movable contact element mounted on said arm near its lower end, and a stationary contact element cooperable with said movable contact element, said arm being adapted to be set into oscillation by movements of the shaft whereby to effect momentary engagement of said contact elements.

2. The combination with weighing mechanism including a rotatable shaft, of an electrical contactor device operable in response to shaft rotation and comprising a contact carrying arm having an eye portion at one end through which the shaft extends, said arm depending from said shaft and the eye portion thereof being loose on said shaft, whereby any movement of said shaft sets up oscillation of said arm relative to the shaft, a movable contact member on the lower end of said arm, a stationary contact member in the path of said movable contact member for engagement thereby when the arm is swung out of its normal, vertical position, and a weight secured to and adapted for adjustment along said arm.

3. The combination with weighing mechanism including a rotatable shaft, of an electrical contactor device operable in response to shaft rotation, said device comprising a ring portion of greater diameter than that of the shaft, loosely disposed thereon, a contact carrying arm secured to and depending from said ring portion, said arm being freely oscillatable, opposed movable contacts on the lower end of said arm, and stationary contacts adapted, alternately, to be engaged by said movable contacts during oscillation of said arm.

4. The combination with weighing mechanism including a rotatable shaft, of an electrical contactor device operable in response to shaft rotation, said device comprising a ring portion of greater diameter than that of the shaft, loosely disposed thereon, a contact carrying arm secured to and depending from said ring portion, said arm being freely oscillatable, a weight secured to and adapted for adjustment along said arm, opposed movable contacts on the lower end of said arm, and stationary contacts adapted, alternately, to be engaged by said movable contacts during oscillation of said arm.

5. The combination with weighing mechanism including a rotatable shaft, of an electrical contactor device operable in response to movement of said shaft, said device comprising a metal rod bent to form an eye at one end thereof, the internal diameter of said eye being greater than the shaft diameter, said rod being supported dependingly from said shaft by means of said eye, means on said shaft for preventing displacement of said rod therealong, movable contacts secured to the lower end, at opposite sides of said rod, a U-shaped bracket having upstanding arm portions disposed on opposite sides of the rod, horizontal members threaded for adjustment in said arm portions, stationary contact elements disposed on the inner ends of said horizontal members, each adapted to coact with one of said movable contacts, and a weight secured to and adapted for adjustment along said rod, said rod being adapted to be oscillated in the manner of a pendulum by movement of the shaft, whereby to effect alternate interengagement of said movable and stationary contacts.

RAYMOND F. BROWN.